US012726796B2

(12) United States Patent
Brodersen et al.

(10) Patent No.: US 12,726,796 B2
(45) Date of Patent: Sep. 1, 2026

(54) PROCESS AND ARRANGEMENT FOR TRANSMITTING A VOICE MESSAGE

(71) Applicant: Dräger Safety AG & Co. KGaA, Lübeck (DE)

(72) Inventors: Michael Brodersen, Lübeck (DE); Heiko Marz, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 200 days.

(21) Appl. No.: 18/748,313

(22) Filed: Jun. 20, 2024

(65) Prior Publication Data

US 2024/0430647 A1 Dec. 26, 2024

(30) Foreign Application Priority Data

Jun. 22, 2023 (DE) ..................... 10 2023 116 369.8

(51) Int. Cl.

*H04W 4/12* (2009.01)
*H04W 4/18* (2009.01)
*H04W 24/08* (2009.01)

(52) U.S. Cl.

CPC ............... *H04W 4/12* (2013.01); *H04W 4/18* (2013.01); *H04W 24/08* (2013.01)

(58) Field of Classification Search

CPC ......... H04W 4/12; H04W 4/18; H04W 24/08; H04L 65/4061; H04L 65/80; H04M 3/2236

USPC ........................ 455/414.1; 370/259; 379/157

See application file for complete search history.

(56) References Cited

U.S. PATENT DOCUMENTS

2006/0014527 A1* 1/2006 Oh .................... H04M 1/72433 455/413
2011/0051790 A1* 3/2011 Honda ................. H04B 1/0475 455/296
2012/0275579 A1* 11/2012 Eng ....................... H04M 3/533 379/88.17
2015/0072657 A1* 3/2015 Lu ..................... H04M 3/53333 455/412.2

(Continued)

FOREIGN PATENT DOCUMENTS

| | | | |
|---|---|---|---|
| DE | 102015005577 | A1 | 11/2016 |
| DE | 102016100672 | A1 | 7/2017 |
| WO | 2018028871 | A1 | 2/2018 |

*Primary Examiner* — Juan A Torres

(74) *Attorney, Agent, or Firm* — McGlew and Tuttle, P.C.

(57) ABSTRACT

A transmission process and arrangement transmit a voice message from a sender-side voice input unit (6) to a recipient-side voice output unit (13). The input voice message (SN.E) is converted into a voice message signal (SS.E) that is transmitted via a transmission channel (Ü), and is converted back into a voice message (SN.A) and output by a recipient-side voice output unit (12). The transmission channel includes a signal processing unit (20, 21), a sender-side radio unit (7) and a recipient-side radio unit (17). An adjustment procedure is carried out including generating a test signal (T.E) which is transmitted in the transmission channel (Ü) and transmitted back to the measurement and adjustment unit (22) that generated the test signal. The measurement and adjustment unit evaluates a quality of the transmission channel and changes a parameter value (PW) of the signal processing unit if necessary. No radio unit adjustment is required.

15 Claims, 5 Drawing Sheets

(56) References Cited

U.S. PATENT DOCUMENTS

2023/0254055 A1 * 8/2023 Ikebe .................... H04B 17/29
455/67.12

* cited by examiner

16
SN.A
SW
TN
TS
12
15;24
SS.A
T.A
17
115
Ü
SS.Ü
F.S
T.Ü
18
7
110
4
11;12
T.S
23
100
21
Vout
V+
V-
PW
22
20.1
20
SS.E
T.E
6
2
21.1
SN.E Sw
SN.E
6
SS.E
T.E
20
SS.Ü
T.Ü
21
Vout
PW
22
T.A
23
4
7
SS.Ü
T.Ü
F.s
17
Ü
SS.A
T.A
12
SN.A
100
Sw
SN.E.a
6.a
SS.E.a
20.a
SS.Ü.a
21.a
23.a
4.a
7.a
F.s.a
17.a
Ü.a
SS.A.a
12.a
SN.A.a
100.a

PROCESS AND ARRANGEMENT FOR TRANSMITTING A VOICE MESSAGE

CROSS REFERENCE TO RELATED APPLICATIONS

This application claims the benefit of priority under 35 U.S.C. § 119 of German Application 10 2023 116 369.8, filed Jun. 22, 2023, the entire contents of which are incorporated herein by reference.

TECHNICAL FIELD

The invention relates to a transmission process and a transmission arrangement which are capable of transmitting a voice message from a sender-side voice input unit to a recipient-side voice output unit. A human being (the sender) uses the sender-side voice input unit to input the voice message. The voice message is converted into a voice message signal. The voice message signal is transmitted in a transmission channel and converted back into a voice message. The recipient-side voice output unit outputs the voice message to another human being (to the recipient), i.e. in a form that can acoustically be perceived by a human being.

BACKGROUND

Different devices and/or different transmission processes are generally used to transmit the voice message. In addition, ambient noise can occur and, in particular, a radio link of the transmission channel can be affected by interference. Nevertheless, the recipient should be able to understand the voice message clearly and unambiguously.

SUMMARY

It is an object of the invention to provide a transmission process and a transmission arrangement which are able to transmit and output a voice message and reduce the risk that the voice message output after transmission is only incompletely understood or is acoustically misunderstood by the recipient.

The problem is solved by a transmission process with features according to the invention and by a transmission arrangement with features according to the invention. Advantageous embodiments of the transmission process are disclosed. Advantageous embodiments of the transmission process according to the invention are, where appropriate, also advantageous embodiments of the transmission arrangement according to the invention and vice versa.

The terms "voice message" and "voice message signal" are used below. A voice message is generated by a human being with his/her speech organ (voice) and transmitted by sound waves (acoustic waves) through the air or through another gaseous medium. Another human being can perceive this voice message acoustically with his/her ears (hearing). A voice message signal can be transmitted by cable and/or radio waves and generated and/or processed by a signal processing unit. A voice input unit is capable of receiving a voice message that can be perceived acoustically by a human being and of converting it into a voice message signal. Conversely, a voice output unit is capable of receiving a voice message signal, converting it into a voice message, and outputting it acoustically and optionally in another manner that can be perceived by a human being. A microphone is an example of a voice input unit, a loudspeaker (speaker) and a headphone are two examples of a voice output unit.

In addition, the terms "transmission channel" and "transmission of a signal in a transmission channel" are used in the following. A transmission channel is an arrangement with a sequence of signal processing devices and optionally connection units, this arrangement receiving and transmitting an input signal and outputting an output signal, the output signal depending on the input signal and in many cases ideally being equal to the input signal. Unless otherwise mentioned, this transmission of a signal can be carried out by means of electromagnetic waves, in particular radio waves, and/or by cable (wire). Conventional and generally standardized processes of signal transmission can be used, in particular mobile radio processes.

According to the transmission process according to the invention, a voice message is transmitted from a sender-side voice input unit to a recipient-side voice output unit. The transmission arrangement according to the invention comprises a transmission device which is capable of transmitting a voice message.

The transmission of the voice message comprises the following steps:

- The sender-side voice input unit receives an input voice message as the voice message to be transmitted. The sender-side voice input unit converts the input voice message into an input voice message signal.
- The input voice message signal is transmitted to the transmission channel, preferably via a wired connection.
- The transmission channel transmits the input voice message signal and outputs an output voice message signal as a result of the transmission.
- The output voice message signal is transmitted from the transmission channel to the recipient-side voice output unit, preferably via a wired connection.
- The recipient-side voice output unit receives the transmitted output voice message signal, converts it into an output voice message and outputs the output voice message acoustically.

The transmission device is configured to transmit a voice message through these steps.

The process of transmitting the input voice message signal in the transmission channel comprises the following steps:

- A signal processing unit receives and processes the input voice message signal. Preferably, the signal processing unit amplifies the input voice message signal and/or performs equalization (rectifying).
- The signal processing unit can comprise several individual function blocks and/or components. The signal processing unit has at least one changeable parameter to which a value is assigned. The signal processing unit applies the assigned parameter value to process the input voice message signal. The respective used value of the or each changeable parameter influences the processing of the voice message signal by the signal processing unit. It is of course possible that the signal processing unit has further parameters, including parameters that are not necessarily changeable.
- The processed input voice message signal is transmitted from the signal processing unit to a sender-side radio unit and from the sender-side radio unit to a recipient-side radio unit. The transmission from the sender-side radio unit to the recipient-side radio unit is carried out on a radio link, i.e. wirelessly by means of radio waves.

The transmission from the signal processing unit to the sender-side radio unit can be wired and/or wireless, in particular using a Bluetooth connection.

The recipient-side radio unit receives the transmitted signal and outputs it as the output voice message signal.

The transmission device is configured to transmit a voice message in the transmission channel. The signal processing unit and both radio units are parts of the transmission channel.

Before the step of transmitting the voice message, at least once an adjustment procedure is performed, optionally several times, or several adjustment procedures are performed. For example, the adjustment procedure is performed again if the first adjustment procedure did not produce a good result. The or at least one adjustment procedure is carried out automatically using a signal-processing measurement and adjustment unit. This measurement and adjustment unit is a component of the transmission arrangement according to the invention.

The adjustment procedure comprises the following steps:

The measurement and adjustment unit generates an input test signal.

The input test signal is transmitted to the transmission channel.

The input test signal is transmitted through the transmission channel. Transmission in the transmission channel generates an output test signal depending on the input test signal. Ideally, the output test signal matches the input test signal. In practice, the output test signal usually deviates from the input test signal.

The output test signal is transmitted with a bypassing of the transmission channel back to the measurement and adjustment unit, i.e. past the transmission channel, preferably exclusively or at least over a partial distance by wire.

The measurement and adjustment unit evaluates the quality of the transmission channel (transmission channel quality assessment). For this evaluation, the measurement and adjustment unit uses the received output test signal and preferably compares it with the input test signal.

The measurement and adjustment unit calculates a value for the or at least one changeable parameter of the signal processing unit. To calculate the or each parameter value, the measurement and adjustment unit uses the transmission channel quality assessment.

The or each calculated parameter value is caused to be transmitted to the signal processing unit. Furthermore, the signal processing unit is caused to use the or at least one transmitted parameter value to process the input voice message signal. Optionally, the parameter value is stored and used as required, even several times.

Preferably, several voice messages are transmitted in succession from the sender-side voice input unit to the recipient-side voice output unit after the adjustment procedure has been carried out once.

According to the invention, the transmission channel to which the adjustment procedure relates comprises a radio link from the sender-side radio unit to the recipient-side radio unit. As a result, it is not necessary to connect the sender-side voice input unit to the recipient-side voice output unit by means of a cable in order to transmit the voice message. In many possible applications of the invention this would not even be possible, for example if the sender is a firefighter or other emergency worker who wants to transmit a voice message to an incident commander or other colleague. As a rule, the recipient can move relatively freely in relation to the sender. Nevertheless, in many cases the invention ensures that the recipient understands the voice message acoustically.

Thanks to the invention, the quality in the transmission channel is automatically measured and improved if necessary. In particular, the audio quality is improved if necessary. Thanks to the invention, the output voice message can often acoustically be understood well even if only a relatively low bandwidth is available in the transmission channel.

Thanks to the invention, it is not necessary for a user to manually change a setting (adjustment) of the transmission channel. In particular, in many cases it is not necessary for a service technician to be on site to make a setting or to change an existing setting. Furthermore, it is not necessary for the sender himself/herself to change a setting.

The transmission channel is realized using the signal processing unit and the two radio units. According to the invention, the measurement and adjustment unit automatically adjusts the signal processing unit to a certain degree to the two radio units and to the ambient conditions. Thanks to the invention, the two radio units do not need to be modified. Also, an interface or a coupling point between the signal processing unit and the sender-side radio unit need not necessarily meet a certain standard and need not be adapted either. A single signal processing unit is sufficient, which can be arranged on the sender side, on the recipient side, or at a spatial distance from both the sender and the recipient.

Rather, according to the invention it suffices to improve the transmission channel quality by assigning a previously calculated respective value to the or at least one parameter of the signal processing unit and using this parameter value. This feature of the invention is particularly advantageous if the signal processing unit and the radio units originate from at least two different manufacturers and/or use different methods of signal processing. The invention is also advantageous if no used parameter of a radio unit that influences a signal transmission and/or no parameter of a voice input unit or a voice output unit can be changed externally, i.e. by an intervention from outside.

The invention can be integrated into an existing transmission device with relatively little effort, wherein the existing transmission device is configured to transmit a voice message. As a rule, the existing devices of the transmission channel, in particular the signal processing unit and the two radio units, can continue to be used. In many cases, the measurement and adjustment unit can be implemented using software on a control unit or on the signal processing unit or another computer of the transmission device or on a spatially remote computing unit. To transmit the output test signal with a bypassing of the transmission channel to the measurement and adjustment unit, it is often sufficient to add a cable that can be connected on one side to the recipient-side radio unit or to the recipient-side voice output unit or another recipient-side device and on the other side to the measurement and adjustment unit. This cable is only required for the adjustment procedure, but usually not for the transmission of the voice message.

According to the invention, the output test signal is transmitted with a bypassing of the transmission channel to the measurement and adjustment unit. In a preferred embodiment, the output test signal is transmitted back from a recipient-side device to the measurement and adjustment unit using a wired connection. The wired connection is preferably established using at least one cable. The recipient-side device is the recipient-side radio unit or another recipient-side device, wherein the other recipient-side device is located downstream of the recipient-side radio unit with respect to the voice message and also receives the output voice message signal and the output test signal. The wired connection is established before the input test signal is generated. After the adjustment procedure has been carried out, the wired connection is preferably removed again. The wired connection therefore does not limit the process of transmitting the voice message from the sender to the recipient and does not limit the position of the voice input unit and the radio units relative to each other during this transmission.

According to this embodiment, the output test signal is therefore transmitted from the recipient-side device back to the measurement and adjustment unit using a wired connection. This retransmission preferably does not use a radio link. In many cases, the output test signal is therefore only slightly changed during retransmission. In many cases, the measurement and adjustment unit therefore uses the retransmitted signal as the output test signal or only needs to perform standard processing of the retransmitted signal in order to generate the output test signal and to evaluate the quality of the transmission channel.

In a further implementation of this embodiment, the recipient-side radio unit acts as the recipient-side device. The output test signal is transmitted back to the measurement and adjustment unit via a wired connection. In this embodiment, the output test signal is transmitted exclusively via wired transmission elements. Preferably, these wired transmission elements include a cable that connects the recipient-side radio unit to the measurement and adjustment unit or to another device. This other device physically comprises the measurement and adjustment unit or is connected to the measurement and adjustment unit by a signal line. This cable is only used for the adjustment procedure but not for transmitting the voice message. No radio link is therefore required to transmit the output test signal back to the measurement and adjustment unit. As a result, in many cases the retransmitted signal matches the output test signal at the output of the recipient-side radio unit sufficiently well.

In an alternative implementation of this embodiment, a recipient-side voice input unit is used as the recipient-side device, in particular a recipient-side microphone. Preferably, this recipient-side voice input unit can be used on the one hand for the adjustment procedure and on the other hand for the recipient to be able to transmit a subsequent voice message to the sender, for example an acoustic confirmation that the voice message has been received and acoustically understood by the recipient.

According to this alternative implementation, the output test signal is transmitted from the recipient-side radio unit to the recipient-side voice output unit. The recipient-side voice output unit converts the output test signal into a test signal voice message. The recipient-side voice input unit receives the test signal voice message and converts it into a test signal. This test signal is transmitted to the measurement and adjustment unit using the wired connection. The measurement and adjustment unit receives the transmitted test signal and uses it as the output test signal. Optionally, the measurement and adjustment unit processes the received test signal.

The alternative implementation avoids the need to connect the recipient-side radio directly to a wired transmission element. In some cases, this is not possible due to the lack of a suitable coupling point at the radio unit.

According to the invention, the measurement and adjustment unit determines (calculates) an evaluation of the quality of the transmission channel. In one embodiment, this transmission channel is understood (perceived) as a theoretical system (system model) which system is excited by the input test signal and generates the output test signal in response to this excitation. In many cases, the transmission channel can be understood as a linear time-invariant system. The measurement and adjustment unit determines and evaluates an indicator for a system behavior of this system in the time domain or in the frequency domain, in particular a transfer function in the frequency domain. The measurement and adjustment unit evaluates the transmission channel quality depending on an evaluation of the indicator for the system behavior. For example, the measurement and adjustment unit derives a frequency response in the complex (domain) of the theoretical system just mentioned. This configuration makes it possible to apply proven processes for system analysis.

According to the invention, a voice message is transmitted from a sender-side voice input unit to a recipient-side voice output unit. Depending on the input voice message, a voice message signal is generated and is transmitted in the transmission channel. The adjustment procedure is used to determine and apply a value for a changeable parameter of the signal processing unit, optional a respective value for several parameters. In one embodiment, additionally a further voice message is transmitted from a further sender-side voice input unit to a further recipient-side voice output unit. According to this embodiment, a further sender (a further human being) transmits the further voice message to the same recipient or to a further recipient. Or the same sender (the same human being) transmits the further voice message to a further recipient. It is possible that the same voice input unit functions both as the sender-side voice input unit and as the further sender-side voice input unit. Alternatively, it is possible that the same voice output unit functions both as the recipient-side voice output unit and as the further recipient-side voice output unit. It is also possible that two different sender-side voice input units and two different recipient-side voice output units are used.

According to this embodiment, the further sender-side voice input unit receives the further voice message to be transmitted as a further input voice message and converts it into a further input voice message signal. The further input voice message signal is transmitted to a further transmission channel and is transmitted through the further transmission channel. Depending on the further input voice message signal, the further transmission channel outputs a further output voice message signal, which is transmitted to the further recipient-side voice output unit. The further recipient-side voice output unit receives the further output voice message signal, converts it into a further output voice message, and outputs the further output voice message acoustically.

The further transmission channel comprises a further signal processing unit, a further sender-side radio unit and a further recipient-side radio unit. The further signal processing unit is a device different from the signal processing unit. Preferably, the two signal processing units are two different specimens of the same type. It is possible that the same radio unit functions both as the sender-side radio unit and as the further sender-side radio unit. It is also possible for the same radio unit to function both as the recipient-side radio unit and as the further recipient-side radio unit. It is also possible that a total of four different radio units are used.

The step of transmitting the further input voice message signal in the further transmission channel comprises the following steps:

The further signal processing unit receives the further input voice message signal and processes it.

The processed further input voice message signal is transmitted from the further signal processing unit to the further sender-side radio unit and via a further radio link from the further sender-side radio unit to the further recipient-side radio unit.

The further recipient-side radio unit emits (outputs) the further output voice message signal.

The following steps are carried out before the further voice message is transmitted:

The adjustment procedure according to the invention is carried out. By doing so, the measurement and adjustment unit determines a value for at least one changeable parameter of the signal processing unit.

The or at least one, preferably every parameter value that the measurement and adjustment unit has determined as a result of the adjustment procedure is additionally transmitted to the further signal processing unit.

This triggers the or each transmitted value for the respective parameter of the further signal processing unit to be used to transmit the further voice message.

In other words, the result of the adjustment procedure according to the invention is applied not only to the signal processing unit, but also to the further signal processing unit. This embodiment eliminates the need to carry out a further adjustment procedure for the transmission of the further voice message. In many cases, it is possible to carry out the adjustment procedure once in advance and apply the or each determined parameter value to each further transmission channel, each of which comprises an identical signal processing unit (other specimen of the same type) and two identical radio units. "Identical" refers to the two transmission channels.

In one embodiment, the recipient-side voice output unit is connected to an actuation unit, whereby a human being is able to actuate this actuation unit. The step that the actuation unit is actuated triggers the step that the adjustment procedure of the transmission process according to the invention is triggered. This embodiment enables the following procedure: A voice message is transmitted in the transmission channel without the adjustment procedure necessarily having been carried out beforehand. The recipient can actuate the actuation unit if he/she has not understood at all the received voice message acoustically or has not understood it reliably. As a reaction, the adjustment procedure is carried out, and the sender can enter a voice message again. Preferably, the actuation of the actuation unit also causes the sender to be informed that the recipient has actuated the actuation unit. This embodiment reduces the risk that the recipient does not understand a voice message from the sender acoustically or does not understand it reliably and the sender does not notice this.

In one embodiment, the sender-side voice input unit, the sender-side radio unit, and the signal processing unit are components of a sender-side personal protective equipment. This personal protective equipment can be worn by a human being on his/her body. This human being is, for example, a firefighter or other rescue worker or responder, and the personal protective equipment includes, for example, a breathing mask and/or a protective helmet and/or protective clothing. The transmission process is carried out while this human being is wearing the personal protective equipment on his/her body. This human being is then the sender of the voice message. It is possible for two human beings to wear respective personal protective equipment on their bodies and exchange voice messages with each other using the invention.

In a first implementation of this embodiment, the measurement and adjustment unit is also part of the sender-side personal protective equipment. The adjustment procedure is carried out while the human being is wearing the personal protective equipment with the measurement and adjustment unit on his/her body.

In a second implementation of this embodiment, the measurement and adjustment unit is part of a remote computing unit. At least temporarily, a data connection is established between the sender-side personal protective equipment and the computing unit with the measurement and adjustment unit. It is also possible that in the second implementation, the adjustment procedure is carried out while the human being is wearing the personal protective equipment on his/her body.

The first implementation eliminates the need to establish a data connection between the personal protective equipment and a remote computing unit. The second implementation makes it possible to use and provide a powerful computing unit. The same measurement and adjustment unit can be used successively for different personal protective equipment, including different types of personal protective equipment.

The invention also relates to a system with the transmission arrangement according to the invention, the sender-side personal protective equipment and optionally the recipient-side personal protective equipment.

The invention is described below by means of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
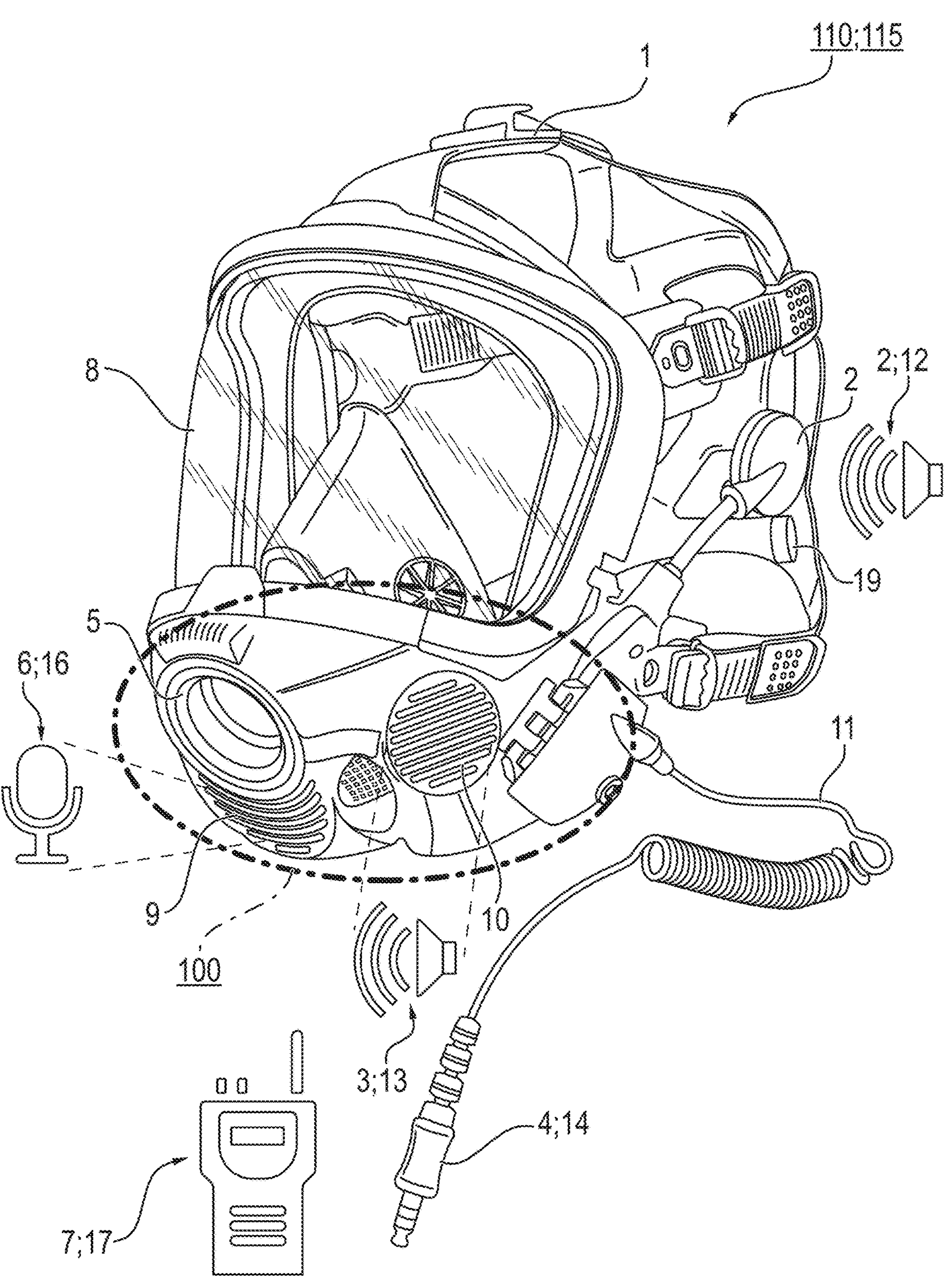
FIG. 1 is a perspective partially schematic view showing an example of a respiratory mask with a communication unit.

Referring to the drawings, the invention is explained using the example of a respiratory mask (respiratory protection mask/respirator/breathing mask) 110, which is shown as an example in FIG. 1. The respiratory mask 110 can be placed around the head of a user and fluid-tightly surrounds the user's head. The user is, for example, a firefighter or other rescue worker or a worker in a production facility.

The respiratory mask 110 is connected to a compressed air breathing apparatus for breathing air, not shown. The user wears the compressed air breathing apparatus on his/her back, for example. The compressed air breathing apparatus supplies the user with breathing air through a hose not shown. The respiratory mask 110 prevents the user from inhaling ambient air, which may be contaminated with harmful gases or particles.

The respiratory mask 110 includes the following components:

- a face mask 1 with straps, whereby the face mask 1 rests against the user's head,
- an exhalation valve 9 in the face mask 1,
- two earphones (earbuds) 2, which together function as a sender-side voice output unit,
- a loudspeaker 3, which is referred to below as the "sender-side loudspeaker",
- an area 10 in front of the loudspeaker 3 that is impermeable to gas and permeable to sound waves,
- a connection unit (coupling unit, interface unit) 4 for a radio unit,
- a cable 11 for the connection unit 4, which cable 11 is referred to as the "sender-side cable",
- a connection unit 5 for the compressed air breathing apparatus not shown,
- a microphone 6, hereinafter referred to as the "sender-side microphone", which acts as the sender-side voice input unit, and
- a pivotable visor 8, which is located in front of the user's face.

The earphones 2, the loudspeaker 3 and the microphone 6 are also represented by symbols.

A radio unit 7 can be connected to the connection unit 4, which is referred to as the "sender-side radio unit" and is also shown symbolically. The user wears the sender-side radio unit 7 on his/her protective clothing, for example on his/her safety helmet (not shown).

The user of the respiratory mask 110 is referred to below as the "sender". The sender can enter a voice message into the sender-side microphone 6. The sender-side loudspeaker 3 is able to emit a voice message from the sender acoustically into the immediate vicinity of the respiratory mask 110.

The voice message is also transmitted by the sender to a remote recipient, which is described below. The recipient is a colleague of the sender, for example an incident commander. In one embodiment, the recipient wears a similar respiratory mask 115. The respiratory mask 115 of the recipient comprises

- two earphones, which together act as the recipient-side voice output unit 12,
- an actuation unit 19 in the vicinity of one of the earphones 12,
- a recipient-side loudspeaker 13,
- a recipient-side microphone 16,
- a connection unit 14 and
- a recipient-side radio unit 17 that can be connected to the connection unit 14.

The two radio units 7, 17 can be of the same type or differ from each other. The corresponding reference symbols of the respiratory mask 115 are also shown in FIG. 1.

Conversely, the recipient can enter a voice message into the recipient-side microphone 16. The voice message is transmitted to the sender and output by the sender-side voice output unit 2.

Figure 2:
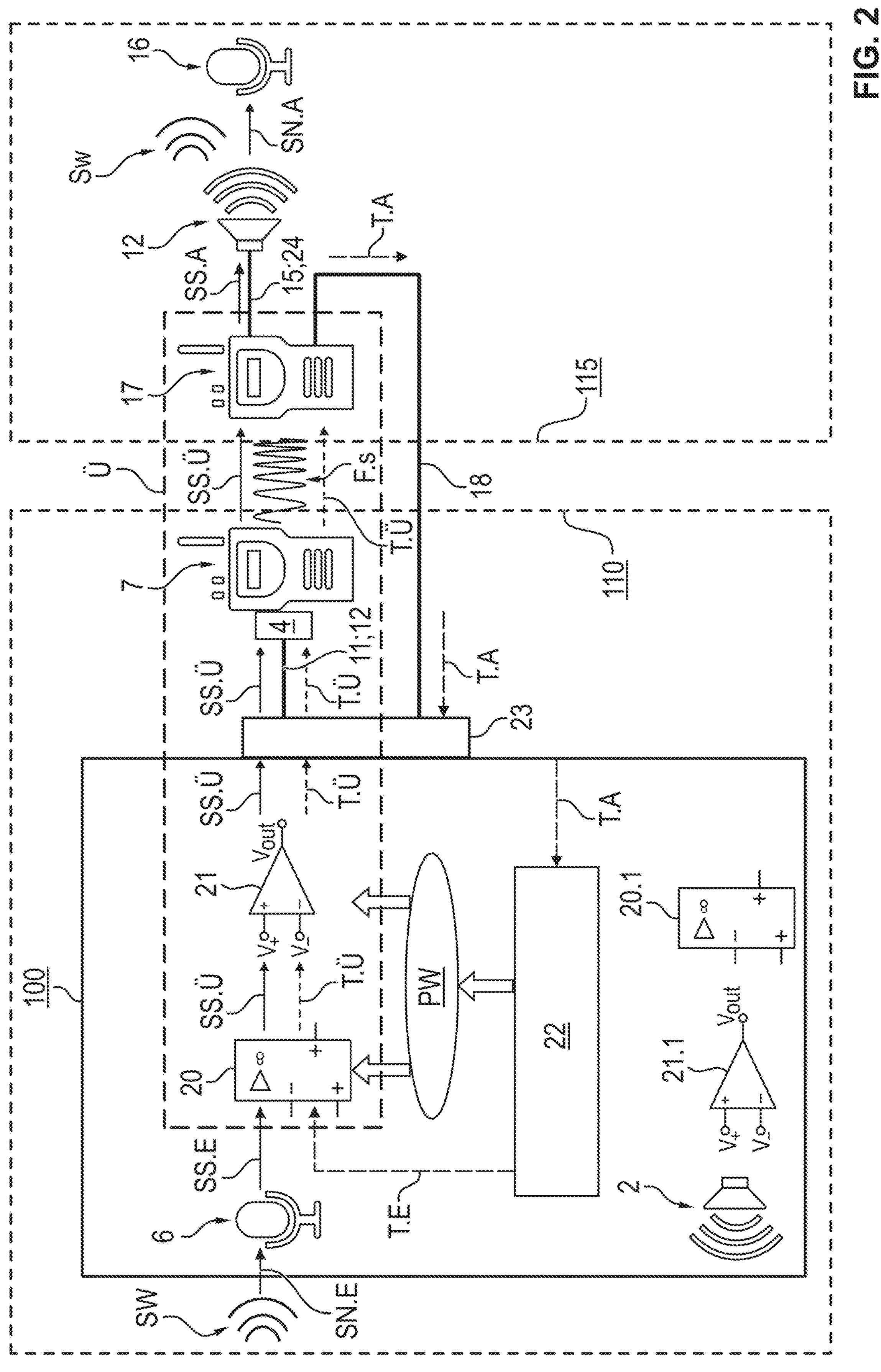
FIG. 2 is a schematic view showing the communication unit according to the invention and the process according to the invention.
Figure 3:
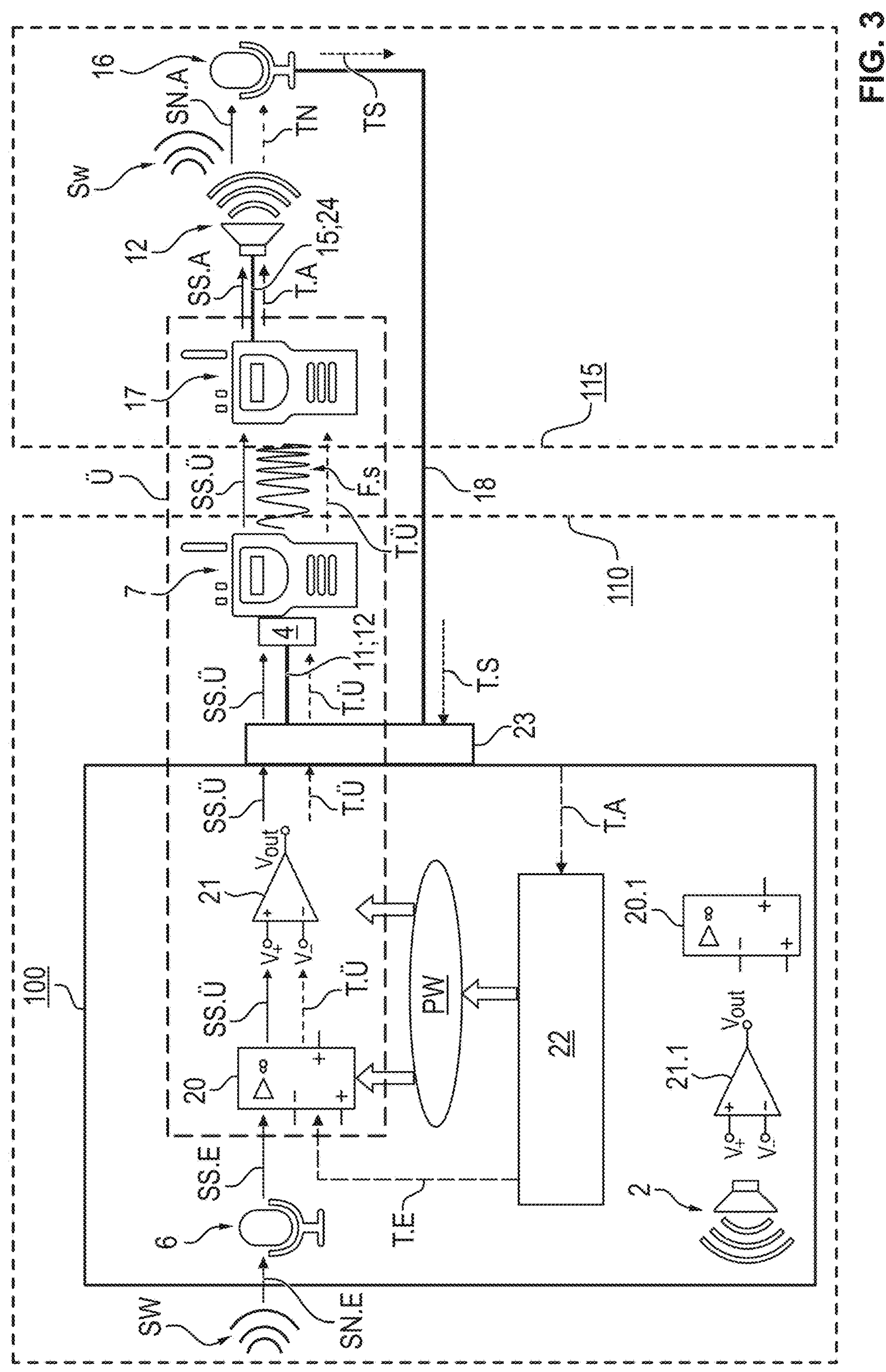
FIG. 3 is a schematic view showing a modification of the process shown in FIG. 2.

FIG. 2 and FIG. 3 illustrate how a voice message is transmitted from the user of the respiratory mask 110, i.e. from the sender to the remote recipient.

Figure 4:
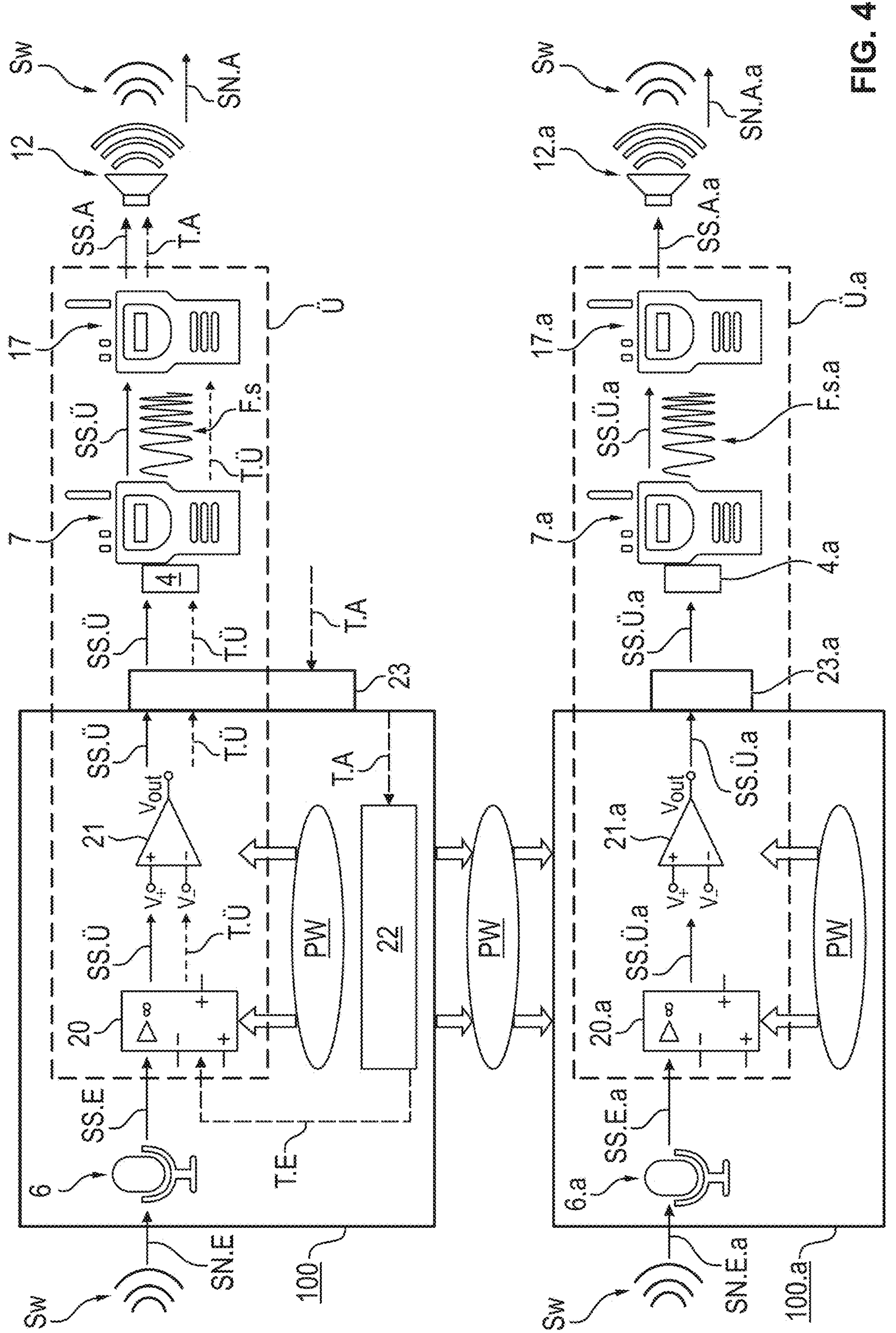
FIG. 4 is a schematic view showing how one communication unit with a measurement and adjustment unit generates a set of parameter values and another communication unit applies this set.

FIG. 2, FIG. 3, and FIG. 4 schematically show a transmission channel Ü (transmission path) in which a signal is transmitted that is generated from the input voice message. This transmission channel Ü comprises a sequence with the following devices:

- an equalization preamplifier 20 and an amplifier 21, which together belong to the (sender-side) signal processing unit within the meaning of this disclosure,
- the sender-side radio unit 7, and
- the recipient-side radio unit 17.

The sender enters (inputs) the voice message acoustically into the sender-side microphone 6. This voice message is referred to as input voice message SN.E. Sound waves Sw are shown schematically in FIG. 2 and FIG. 3. The sender-side microphone 6 generates an electronic input voice message signal SS.E from the input voice message SN.E. This input voice message signal SS.E is transmitted to the transmission channel Ü and transmitted through the transmission channel Ü. The transmission channel Ü outputs an output voice message signal SS.A as a result of the transmission. The voice message signal in transmission channel Ü is designated SS.Ü. The recipient-side voice output unit 12 receives the output voice message signal SS.A and outputs an output voice message SN.A via sound waves Sw. Ideally, the input voice message SN.E matches the output voice message signal SN.A.

Transmission in the transmission channel Ü comprises the following steps:

- The equalization preamplifier 20 equalizes the input voice message signal SS.E.
- The amplifier 21 amplifies the signal.
- The signal processed in this way is transmitted by cable to a sender-side interface (coupling point) 23 and further transmitted by cable or via Bluetooth or in a further wireless manner to the sender-side radio unit 7.
- The sender-side radio unit 7 transmits the processed voice message signal SS.Ü in a radio link Fs to the recipient-side radio unit 17 by means of radio waves.
- The recipient-side radio unit 17 emits the output voice message signal SS.A.
- The output voice message signal SS.A is transmitted via a recipient-side cable 15 or a Bluetooth connection 24 to the recipient-side voice output unit 12.
- The recipient-side voice output unit 12 converts the received signal SS.A back into a voice message and outputs this acoustically to the recipient. The output voice message is referred to as output voice message SN.A and ideally corresponds to the input voice message SN.E.

Conversely, a voice message is transmitted from the recipient via the recipient-side microphone 16, the recipient-side radio unit 17, the sender-side radio unit 7 and the sender-side voice output unit 2 to the sender along a corresponding path. A further amplifier 21.1 and a further equalization preamplifier 20.1 are shown, which process received voice messages. The sender-side microphone 6 and the sender-side loudspeaker 3 can be components of a sender-side headphone. Similarly, the recipient-side microphone 16 and the recipient-side voice output unit 12 can be components of a recipient-side headphone.

The sender-side loudspeaker 3, the sender-side microphone 6, the two equalization preamplifiers 20, 20.1, the two amplifiers 21, 21.1 and the sender-side interface 23 belong to a communication unit 100, which in one implementation is configured as a component or belongs to a component. In another embodiment, parts of the communication unit 100 are implemented by software, whereby this software runs on a processor during use. In one embodiment, the component with the communication unit 100 is attached to the respiratory mask 110, for example detachably with a snap-in fastener, or integrated into the respiratory mask 110. It is also possible that the component with the communication unit 100 can be attached to the protective clothing of the user (sender).

This communication unit 100 is shown schematically by an ellipse in FIG. 1 and schematically by a rectangle in FIG. 2 and FIG. 3. The sender-side radio unit 7 can be detachably connected to this communication unit 100 using the cable 11 and the connection unit 4 shown in FIG. 1, or a Bluetooth connection 24, or alternatively using the cable 11 and the connection unit 4 or the Bluetooth connection 24.

Obviously, it is important that the recipient can understand a voice message from the sender acoustically well, ideally every word, even if there is considerable ambient noise and interference can affect the transmission channel Ü. This effect should also be achieved if the communication unit 100 and the radio units 7 and 17 come from different manufacturers and/or use different transmission processes. For this reason, the communication unit 100 carries out an automatic adjustment procedure in advance. Preferably, the communication unit 100 can be operated either in an operation mode, in which a sender can transmit a voice message to a recipient, or in a setting mode, in which the automatic adjustment procedure is carried out.

In one embodiment, the actuation unit 19 is attached to the respiratory mask 115, which is shown schematically in FIG. 1. If the user of the respiratory mask 115, i.e. the recipient, actuates the actuation unit 19, the step of performing an adjustment procedure is triggered. This embodiment makes it possible that the user of the respiratory mask 115 informs the sender that he/she has acoustically misunderstood a voice message. In many cases, the adjustment procedure changes a parameter value of the communication unit 100 and a subsequent voice message is better understood.

The transmission arrangement comprises a schematically shown signal-processing measurement and adjustment unit 22. In one embodiment, the measurement and adjustment unit 22 is a component of the communication unit 100, see FIG. 2 to FIG. 4. The measurement and adjustment unit 22 can also be spatially separated from the communication unit 100. For example, the measurement and adjustment unit 22 is implemented on a spatially remote computing unit 120, see FIG. 5, in particular by software, and is connected to the communication unit 100, preferably by a wireless data connection. This implementation makes it possible to use the same measurement and adjustment unit 22 in succession for different communication units 100, and also makes it possible to use a more powerful processor for the measurement and adjustment unit 22, compared to an embodiment in which the measurement and adjustment unit 22 is a component of the communication unit 100.

While the automatic adjustment procedure is being carried out, the measurement and adjustment unit 22 generates an input test signal T.E, preferably a signal which, in one implementation, ideally has the form of white noise. This input test signal T.E is fed into the transmission channel Ü. The input test signal T.E is transmitted through the transmission channel Ü. The test signal in the transmission channel Ü is referred to as T.Ü. It is transmitted in the same way as the voice message signal in the transmission channel Ü and is processed by the equalization preamplifier 20 and the amplifier 21 and then transmitted to the recipient-side radio unit 17 via the sender-side interface 23 and the sender-side radio unit 7 and the radio link Fs. For differentiation, the voice message signal SS.E, SS.Ü, SS.A is shown in FIG. 2, FIG. 3, FIG. 4 and FIG. 5 with solid arrows, the test signal T.E, T.Ü, T.A with dashed arrows.

Preferably, the test signal T.Ü is transmitted from the sender-side radio unit 7 to the recipient-side radio unit 17 via DMO (direct mode operation) over the radio link Fs, whereby DMO is a possible setting of a commercially available radio unit. This setting is made by a user or automatically while the automatic adjustment procedure is being carried out. This mode reduces the risk of interference significantly affecting the radio link Fs from the radio unit 7 to the radio unit 17.

The recipient-side radio unit 17 emits an output test signal T.A. The output test signal T.A is transmitted back to the measurement and adjustment unit 22 by bypassing the transmission channel Ü.

FIG. 2 shows a first embodiment of how the output test signal T.A is transmitted with a bypassing of the transmission channel Ü back to the measurement and adjustment unit 22. FIG. 3 shows a second embodiment.

In both embodiments, a wired connection in the form of a cable 18 is connected to the communication unit 100—more precisely: to the sender-side interface 23. The output test signal T.A is transmitted through this cable 18 with a bypassing of the transmission channel Ü to the communication unit 100 and back to the measurement and adjustment unit 22. Preferably, this cable 18 is connected to the communication unit 100 before the measurement and adjustment unit 22 generates the input test signal T.E. After the adjustment procedure is completed, the cable 18 is preferably removed again. Preferably, the cable 18 is only used for the adjustment procedure, but not during operation. Therefore, the cable 18 does not limit the distance that can occur between the sender and the recipient during an operation.

In the first embodiment shown in FIG. 2, the recipient-side radio unit 17 is connected to the sender-side interface 23. The output test signal T.A is transmitted from the recipient-side radio unit 17 through the cable 18 to the sender-side interface 23 and from the sender-side interface 23 to the measurement and adjustment unit 22. The recipient-side voice output unit 12 and the recipient-side microphone 16 are not used in the first embodiment to transmit the test signal T.A.

In the second embodiment shown in FIG. 3, the recipient-side microphone 16 is connected to the sender-side interface 23 by means of the cable 18. The output test signal T.A is transmitted to the recipient-side voice output unit 12. The recipient-side voice output unit 12 generates a test signal voice message TN from the output test signal T.A and outputs the test signal voice message TN acoustically. The output test signal voice message TN is transmitted to the recipient-side microphone 16 via sound waves Sw. The recipient-side microphone 16 converts the received test signal voice message TN into a test signal TS. This test signal TS is transmitted by means of the cable 18 to the sender-side interface 23 and further to the measurement and adjustment unit 22. The measurement and adjustment unit 22 uses the received test signal TS as the output test signal T.A, optionally after signal conditioning and/or preprocessing.

In both embodiments, the measurement and adjustment unit 22 automatically analyzes the received output test signal T.A. Depending on the analysis result, the measurement and adjustment unit 22 automatically changes values of changeable parameters of the communication unit 100 if required, in particular of at least one parameter that determines the gain or attenuation, the equalization, the level and/or the setting of audio filters. In particular, the measurement and adjustment unit 22 changes the values of parameters of the equalization preamplifier 20 and/or the amplifier 21. One aim of the change is to reduce feedback, overmodulation and/or clipping (clipping of amplitudes of large magnitude).

The measurement and adjustment unit 22 thus feeds an input test signal T.E into the transmission channel Ü and receives the output test signal T.A, which is generated at the output of the transmission channel Ü. Because the cable 18 is used to transmit the output test signal T.A back to the measurement and adjustment unit 22 and not the radio link Fs between the two radio units 7 and 17, the output test signal T.A is only changed relatively little during retransmission compared to a wireless transmission in transmission channel Ü.

In many cases, the transmission channel Ü can be understood as a (theoretical) system that is excited by the input test signal T.E and provides the output test signal T.A in response to this excitation. The measurement and adjustment unit 22 calculates an indicator of the system behavior of this system. In many cases, this system can be understood with sufficient accuracy as a linear time-invariant system. In particular, if the measurement and adjustment unit 22 generates an input test signal T.E in the form of white noise, the input test signal T.E can be understood as an impulse excitation and the output test signal T.A as an impulse response of the system. In another implementation, a voice message is transmitted, a voice file is output, and this voice file is evaluated using at least one quality measure.

In the configuration with the linear time-invariant system, the measurement and adjustment unit 22 calculates the frequency response and analyzes the amplitude response and/or the phase response. Through this analysis, the measurement and adjustment unit 22 automatically evaluates the quality of the transmission channel Ü in the frequency range. For example, a target frequency response is specified. The measurement and adjustment unit 22 changes parameter values with the aim of ensuring that the actual frequency response is equal to the specified target frequency response—in practice: deviates sufficiently little from the target frequency response. In one embodiment, the measurement and adjustment unit 22 changes parameter values in such a way that linear equalization is performed, whereby the inverse of the impulse response is used for this equalization. It is possible to evaluate the frequency response only in those ranges and to use it to change parameter values in which the actual frequency response deviates more than a predetermined tolerance from the predetermined target frequency response.

In many cases, it is thanks to the invention not necessary to assign a different value to a parameter of a radio unit 7, 17. This is advantageous because in many cases it is not possible or at least difficult to automatically control from the outside a radio unit 7, 17 and thereby change a radio unit parameter. The invention makes it possible, but generally avoids the need for a user to manually set a radio unit 7, 17 differently. Rather, according to the invention, the communication unit 100 is automatically adapted to the radio units 7, 17 used. Thanks to the invention, it is also not necessary to prescribe a specific standard for the sender-side interface 23.

In one implementation, the measurement and adjustment unit 22 generates a set PW of parameter values. This set PW of parameter values defines settings for components of the communication unit 100 and in many cases leads to a sufficiently good transmission channel Ü, ideally to a transmission channel Ü whose actual frequency response is equal to the predetermined target frequency response.

It is possible for a user to let the automatic adjustment procedure just described being carried out again for each communication unit 100 and each radio unit 7, 17 which can be used together with the communication unit 100, i.e. to let the procedure be repeated. Preferably, however, the user let the adjustment procedure just described be performed once for one instance (specimen) of the communication unit 100 and one respective instance (specimen) of each of the two radio units 7 and 17. The set PW of parameter values generated in this way is then transmitted to and stored in all communication units 100 being identical in construction and can be used whenever such a communication unit 100 is used in conjunction with radio units 7, 17 which are identical in construction to the two radio units 7, 17 used in the adjustment procedure.

In the embodiment according to FIG. 2 to FIG. 4, the measurement and adjustment unit 22 is a component of the communication unit 100. It can also be arranged outside the communication unit 100, see FIG. 5.

FIG. 4 illustrates how the measurement and adjustment unit 22 of the communication unit 100 generates a set PW of parameter values. This set PW of parameter values is transmitted to the communication unit 100 and to a further communication unit 100.*a* of identical construction. The further communication unit 100.*a* also comprises a microphone 6.*a*, an equalization preamplifier 20.*a* and an amplifier 21.*a* as well as an interface 23.*a*. A user (sender) can input a voice message, which is referred to as a further input voice message SN.E.a. The further microphone 6.*a* converts the further input voice message SN.E.a into a further input voice message signal SS.E.a. This signal SS.E.a is transmitted by the further communication unit 100.*a* to a further recipient-side voice output unit 12.*a* via a further sender-side radio unit 7.*a* and a further recipient-side radio unit 17.*a*. An output voice message SN.A.a is output to a recipient. The two further radio units 7.*a* and 17.*a* are connected to each other by a further radio link Fs.a. The components 20.*a*, 21.*a*, 7.*a*, 17.*a* belong to a further transmission channel Ü.a. The further voice message signal in the further transmission channel Ü.a is designated SS.Ü.a. A further output voice message signal SS.A a is output. The further recipient-side voice output unit 12.*a* outputs the further output voice message wsignal SN.A.a depending on the further output voice message signal SS.A a and thereby on the further voice message signal SS.Ü.a.

Before the further voice message is transmitted, the following steps are carried out: The further communication unit 100.*a* receives the set PW of parameter values from the communication unit 100 and applies it to the components 20.*a* and 21.*a*. The further communication unit 100.*a* does not necessarily comprise an own measurement and adjustment unit 22. In many cases, it is sufficient if one communication unit 100 comprises a measurement and adjustment unit 22 which generates a set PW of parameter values as just described, and all other communication units 100.*a*, . . . receive and apply the set PW of parameter values.

In many cases, the two radio units 7 and 17 used for transmission in transmission channel Ü are identical. In this case in particular, the following embodiment of the process can often be used: Sets PW of parameter values are stored on a data memory of the communication unit 100. Each parameter set PW relates to a radio unit which can be connected to the communication unit 100 and then functions as a sender-side radio unit. Each parameter set PW was once generated in advance by applying the adjustment procedure with one specimen of this radio unit as the sender-side radio unit.

During use, the communication unit 100 automatically recognizes the type of the connected sender-side radio unit 7. In particular, if the connection between the communication unit 100 and the sender-side radio unit 7 is established via a Bluetooth connection 24 or another wireless connection, the communication unit 100 is often able to automatically recognize the type of the radio unit 7. Once the communication unit 100 has recognized the type of the connected sender-side radio unit 7, the communication unit 100 automatically selects the associated set PW of parameter values and applies it to the components 20, 21. This embodiment eliminates the need to perform the adjustment procedure described above each time a sender-side radio unit of a different type is used.

Figure 5:
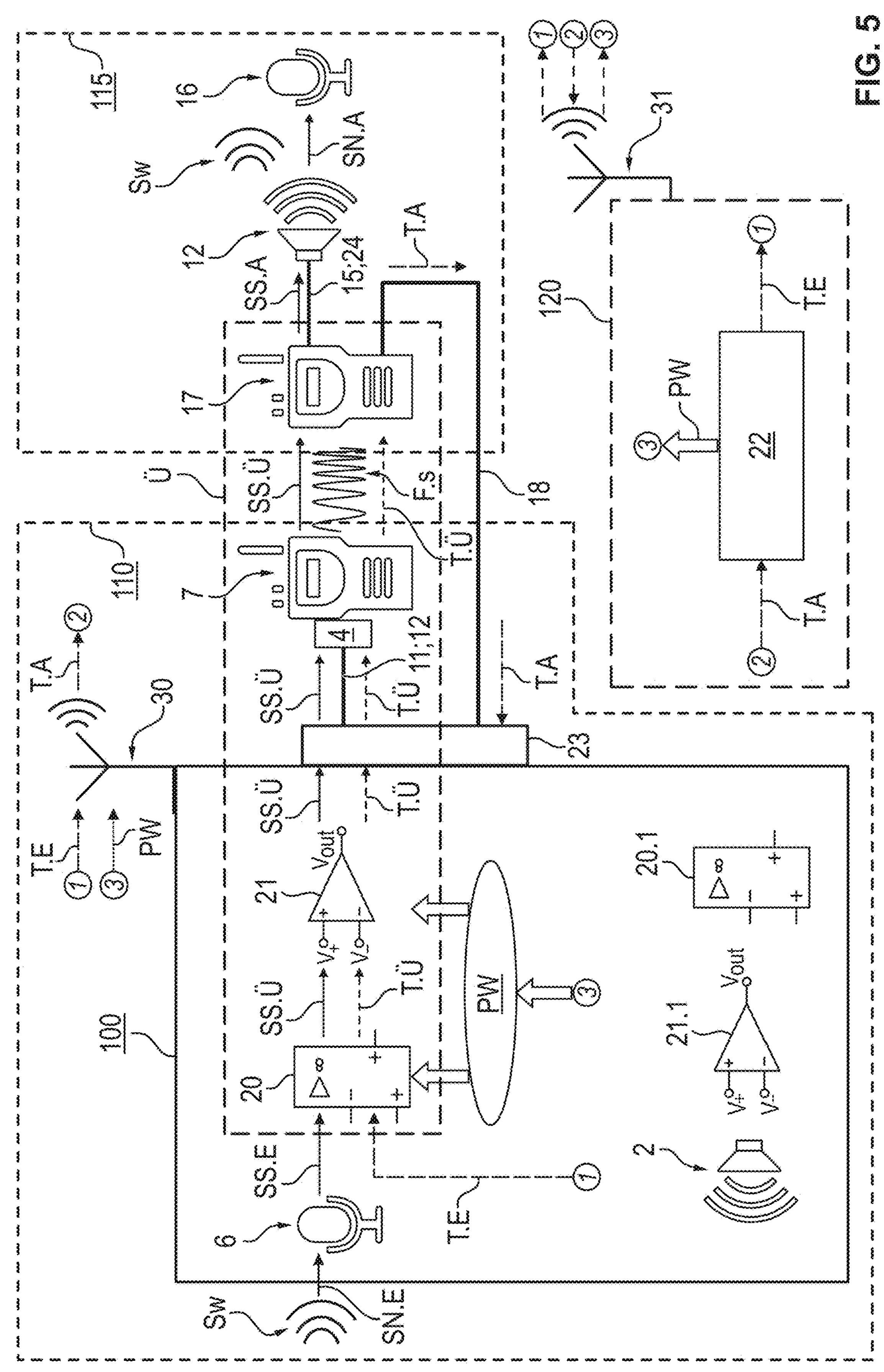
FIG. 5 is a schematic view showing an embodiment in which the measurement and adjustment unit belongs to a spatially remote computing unit.

In the embodiment according to FIG. 2 to FIG. 4, the measurement and adjustment unit 22 is a component of the communication unit 100 and thus of the respiratory mask 110. FIG. 5 shows a different embodiment, in which the measurement and adjustment unit 22 is a component of a spatially remote computing unit 120. The same reference signs have the same meaning in FIG. 5 as in FIG. 2 to FIG. 4.

At least temporarily, a bidirectional data connection is established between the communication unit 100 and the computing unit 120 by means of radio waves. An antenna 30 of the communication unit 100 and an antenna 31 of the computing unit 120 are shown as examples. In the embodiment shown in FIG. 5, the adjustment procedure comprises the following steps:

The generated input test signal T.E is transmitted from the computing unit 120 to the communication unit 100.

The input test signal T.E is transmitted through the transmission channel Ü. This provides an output test signal T.A.

The output test signal T.A is transmitted from the communication unit 100 back to the computing unit 120.

The measurement and adjustment unit 22 generates a set of parameter values PW.

The generated set of parameter values PW is transmitted from the computing unit 120 to the communication unit 100.

While specific embodiments of the invention have been shown and described in detail to illustrate the application of the principles of the invention, it will be understood that the invention may be embodied otherwise without departing from such principles.

LIST OF REFERENCE CHARACTERS

1 Face mask with strap of respiratory mask 110

2 Earphones of the respiratory mask 110, together function as a sender-side voice output unit

3 Sender-side loudspeaker of the respiratory mask 110, arranged behind the area 10

4 Connection unit on the respiratory mask 110 for the radio unit 7

4.*a* Connection unit for the further radio unit 7.*a*

5 Connection unit on the respiratory mask 110 for a compressed air breathing apparatus

6 Sender-side microphone of the respiratory mask 110, functions as the sender-side voice input unit, arranged behind the exhalation valve 9

6.*a* Further sender-side microphone, acts as the further sender-side voice input unit

7 Sender-side radio unit, can be connected to connection unit 4

7.*a* Further sender-side radio unit, can be connected to connection unit 4.*a*

8 Visor of respiratory mask 110

9 Exhalation valve in the face mask 1, located in front of the sender-side microphone 6

10 Area in the face mask 1 that is permeable to sound waves and impermeable to gas, arranged in front of the sender-side loudspeaker 3

11 Sender-side cable of the respiratory mask 110

12 Earphones of the respiratory mask 115, function together as a recipient-side voice output unit

13 Recipient-side loudspeaker

13.2 Further recipient-side loudspeaker, acts as the further recipient-side voice output unit

14 Connection unit on the respiratory mask 115 for the radio unit 17

15 Recipient-side cable

16 Recipient-side microphone, acts as the recipient-side voice input unit

17 Recipient-side radio unit, can be connected to the connection unit 14

18 Cable for transmitting the output test signal T.A

19 Actuation unit of the respiratory mask 115

20, 20.1 Equalization preamplifiers (signal processing units), belong to the communication unit 100

21, 21.1 Amplifiers (signal processing units), belong to the communication unit 100

22 Measurement and adjustment unit, evaluates the quality of the transmission channel Ü, generates the set PW of parameter values, is in one embodiment a component of the communication unit 100 and in another embodiment a component of the computing unit 120

23 Sender-side interface, includes cable 11 and connection unit 4 or Bluetooth connection 24

24 Bluetooth connection

30 Antenna of the communication unit 100

31 Antenna of the computing unit 120

100 Communication unit of the respiratory mask 110, comprises the sender-side loudspeaker 3, the sender-side microphone 6 and the interface 23 with the cable 11, the connection unit 4 and the amplifiers 20, 21 as well as, in one embodiment, the measurement and adjustment unit 22 and, in another embodiment, the antenna 30

110 Respiratory mask of the sender, comprising the strap 1, the earphones 2, the connection units 4 and 5, the radio unit 7, the visor 8, the cable 11, and the communication unit 100

115 Respirator mask of the recipient, includes the earphones 12, the connection unit 14, the radio unit 17 and other components corresponding to the respiratory mask 110

120 Computing unit, spatially remote from the communication unit 100, comprises the measurement and adjustment unit 22 and the antenna 31

Fs Radio link from the sender-side radio unit 7 to the recipient-side radio unit 17

Fs.a Further radio link from the further sender-side radio unit 7.a to the further recipient-side radio unit 17.*a*

PW Set of parameter values, is generated by the measurement and adjustment unit 22 and applied to the components 20 and 21

SN.A Output voice message, emitted by the recipient-side loudspeaker 13

SN.A.a Further output voice message, output by the further recipient-side loudspeaker 12.*a*

SN.E Input voice message, entered into the sender-side microphone 6

SN.E.a Further input voice message, entered into the further sender-side microphone 6.*a*

SS.A Output voice message signal, is output from transmission channel Ü and transmitted to the recipient-side loudspeaker 13

SS.A.a Further output voice message signal, is output by the further transmission channel Ü.a and transmitted to the further recipient-side loudspeaker 12.*a*

SS.E Input voice message signal, is generated by the sender-side microphone 6 and transmitted in transmission channel Ü

SS.E.a Further input voice message signal, is generated by the further sender-side microphone 6.*a* and transmitted in the further transmission channel Ü.a SS.Ü Voice message signal in transmission channel Ü

SS.Ü.a Further voice message signal in transmission channel Ü

Sw Sound waves

T.A Output test signal, is generated at the end of transmission channel Ü

T.E Input test signal, generated by the measurement and adjustment unit 22 and fed into the transmission channel Ü

TN Test signal voice message generated by the recipient-side voice output unit 12

TS Test signal

T.Ü Test signal during transmission in transmission channel Ü

Ü Transmission channel, extends from the equalization preamplifier 20 to the recipient-side radio unit 17

Ü.a Further transmission channel, extends from the further equalization preamplifier 20.*a* to the further recipient-side radio unit 17.*a*

What is claimed is:

1. A transmission process for transmitting a voice message from a sender-side voice input unit to a recipient-side voice output unit, the transmission process comprising the steps of:

the sender-side voice input unit receiving an input voice message as the voice message to be transmitted and converting the input voice message into an input voice message signal;

transmitting the input voice message signal to a transmission channel;

the transmission channel transmitting the input voice message signal and outputting an output voice message signal as a result of the transmission;

transmitting the output voice message signal to the recipient-side voice output unit; and the recipient-side voice output unit receiving the transmitted output voice message signal, converting the transmitted output voice message signal into an output voice message, and outputting the output voice message, wherein the step of the transmission channel transmitting the input voice message signal comprises the steps of:

a signal processing unit receiving and processing the input voice message signal, wherein the signal processing unit has at least one changeable parameter and uses a value for the changeable parameter to process the input voice message signal;

transmitting the processed input voice message signal from the signal processing unit to a sender-side radio unit and via a radio link from the sender-side radio unit to a recipient-side radio unit; and the recipient-side radio unit receiving the transmitted signal and outputting the transmitted signal as the output voice message signal, wherein prior to the step of transmitting the voice message performing at least once an adjustment procedure using a signal-processing measurement and adjustment unit, wherein the adjustment procedure comprises the steps of:

the measurement and adjustment unit generating an input test signal;

transmitting the input test signal to the transmission channel;

transmitting the input test signal through the transmission channel such that an output test signal is generated from the input test signal by the transmission;

transmitting the output test signal back to the measurement and adjustment unit, the transmission being performed with a bypassing of the transmission channel;

the measurement and adjustment unit evaluating a quality of the transmission channel and using the received output test signal for the evaluation;

the measurement and adjustment unit calculating a value for the changeable parameter of the signal processing unit as a function of the evaluation of the transmission channel quality; and the measurement and adjustment unit causing the calculated value for the changeable parameter of the signal processing unit to be transmitted to the signal processing unit and to be used by the signal processing unit.

2. The transmission process according to claim 1, wherein the recipient-side radio unit or another recipient-side device receives the output test signal, wherein before generating the input test signal, the recipient-side radio unit or the other recipient-side device is connected to the measurement and adjustment unit by a wired connection, wherein the step of transmitting the output test signal to the measurement and adjustment unit by bypassing the transmission channel comprises the step of transmitting the output test signal through the wired connection to the measurement and adjustment unit, and wherein the wired connection is disconnected after the adjustment procedure has been carried out.

3. The transmission process according to claim 2, wherein the step of connecting the recipient-side radio unit or the other recipient-side device to the measurement and adjustment unit comprises the step of connecting the recipient-side radio unit to the measurement and adjustment unit by the wired connection, and wherein the adjustment procedure includes transmitting the output test signal from the recipient-side radio unit to the measurement and adjustment unit using the wired connection.

4. The transmission process according to claim 2, wherein the other recipient-side device comprises a recipient-side voice input unit serving as the other recipient-side device, wherein the step of connecting the recipient-side radio unit or the other recipient-side device to the measurement and adjustment unit comprises the step of connecting the recipient-side voice input unit to the measurement and adjustment unit by the wired connection, and wherein the adjustment procedure includes the steps of:

transmitting the output test signal to the recipient-side voice output unit;

the recipient-side voice output unit converting the output test signal into a test signal voice message and outputting the test signal voice message;

the recipient-side voice input unit receiving the test signal voice message and converting the test signal voice message into a test signal;

transmitting the test signal to the measurement and adjustment unit using the wired connection; and the measurement and adjustment unit using the transmitted test signal as the output test signal or processing the transmitted test signal and using the transmitted and processed test signal as the output test signal.

5. The transmission process according to claim 1, wherein the step of the measurement and adjustment unit evaluating the quality of the transmission channel comprises the step of the measurement and adjustment unit:

calculating an indicator for a system behavior in the time domain or in the frequency domain of a system, wherein said system is excited with the input test signal and the system generates the output test signal in response to the excitation; and evaluating the transmission channel quality depending on an evaluation of the indicator for the system behavior.

6. The transmission process according to claim 1, further comprising the steps of:

transmitting a further voice message from a further sender-side voice input unit to a further recipient-side voice output unit, wherein the transmission of the further voice message comprises the steps of:

with the further sender-side voice input unit receiving a further input voice message as the further voice message to be transmitted and converting the further input voice message into a further input voice message signal, transmitting the further input voice message signal to a further transmission channel, with the further transmission channel transmitting the further input voice message signal and outputting a further output voice message signal as a result of the transmission;

transmitting the further output voice message signal to the further recipient-side voice output unit; and with the further recipient-side voice output unit receiving the received further output voice message signal, converting the received further output voice message signal into a further output voice message, and outputting the further output voice message, wherein the transmission of the further input voice message signal in the further transmission channel comprises the steps of:

with a further signal processing unit receiving and processing the further input voice message signal, transmitting the processed further input voice message signal from the further signal processing unit to a further sender-side radio unit and via a further radio link from the further sender-side radio unit to a further recipient-side radio unit; and with the further recipient-side radio unit outputting the further output voice message signal, wherein, prior to the step of transmitting the further voice message, the process comprises the steps of:

transmitting the calculated value for the changeable parameter of the signal processing unit to the further signal processing unit; and causing the transmitted parameter value to be used for a changeable parameter of the further signal processing unit.

7. The transmission process according to claim 1, wherein the recipient-side voice output unit is connected to an actuating unit which can be actuated by a human being, and an actuation of the actuating unit triggers an execution of the adjustment procedure.

8. The transmission process according to claim 1, wherein the sender-side voice input unit, the sender-side radio unit, and the signal processing unit are components of a sender-side personal protective equipment, wherein the sender-side personal protective equipment is configured to be worn by a human on his or her body, and wherein the transmission process is carried out while the human being is wearing the sender-side personal protective equipment.

9. The transmission process according to claim 8, wherein the measurement and adjustment unit is a further component of the sender-side personal protective equipment, and the adjustment procedure is also carried out while the human being is wearing the sender-side personal protective equipment.

10. The transmission process according to claim 8, wherein the measurement and adjustment unit is part of a computing unit which computing unit is arranged spatially remote from the sender-side personal protective equipment, and the adjustment procedure includes the additional steps of:

transmitting the generated input test signal from the computing unit to the sender-side personal protective equipment;

transmitting the output test signal to the computing unit; and transmitting the calculated parameter value from the computing unit to the sender-side personal protective equipment.

11. The transmission process according to claim 8, wherein the recipient-side voice output unit and the recipient-side radio unit are components of a recipient-side personal protective equipment, wherein the recipient-side personal protective equipment is configured to be worn by a human being on his or her body, and the transmission process is carried out while the human being is wearing the recipient-side personal protective equipment.

12. A transmission arrangement for transmitting a voice message, the transmission arrangement comprising:

a transmission device, the transmission device comprising:

a sender-side voice input unit;

a recipient-side voice output unit; and a transmission channel, the transmission channel comprising:

a signal processing unit, a sender-side radio unit and a recipient-side radio unit; and a signal-processing measurement and adjustment unit, wherein the transmission device is configured to receive, at the sender-side voice input unit, an input voice message as the voice message to be transmitted and to convert the input voice message into an input voice message signal, to transmit the input voice message signal to the transmission channel, to transmit, with the transmission channel, the input voice message signal and to output an output voice message signal as a result of the transmission, to transmit the output voice message signal to the recipient-side voice output unit, and to receive, at the recipient-side voice output unit, the transmitted output voice message signal, to convert the transmitted output voice message signal into an output voice message, and to output the output voice message, to receive and process, with the signal processing unit, the input voice message signal, wherein the signal processing unit has at least one changeable parameter and uses a value for the changeable parameter to process the input voice message signal, to transmit the processed input voice message signal from the signal processing unit to a sender-side radio unit and via a radio link from the sender-side radio unit to the recipient-side radio unit, and to receive, with the recipient-side radio unit, the transmitted signal and to output the transmitted signal as the output voice message signal, and wherein the measurement and adjustment unit is configured to perform an adjustment procedure comprising the steps of:

the measurement and adjustment unit generating an input test signal;

transmitting the input test signal to the transmission channel;

transmitting the input test signal through the transmission channel, such that an output test signal is generated from the input test signal by the transmission in the transmission channel;

transmitting the output test signal back to the measurement and adjustment unit, the transmission being performed with a bypassing of the transmission channel;

evaluating, with the measurement and adjustment unit, a quality of the transmission channel and using the received output test signal for the evaluation;

calculating, with the measurement and adjustment unit, a value for the changeable parameter of the signal processing unit as a function of the evaluation of the transmission channel quality, and causing, with the measurement and adjustment unit, the calculated value for the parameter to be transmitted to the signal processing unit and to be used by the signal processing unit.

13. The transmission arrangement according to claim 12, further comprising a cable for wired data transmission, wherein the cable is configured to detachably connect the recipient-side radio unit or another recipient-side device to the measurement and adjustment unit and to establish a wired data connection between the recipient-side radio unit or the other recipient-side device and the measurement and adjustment unit, and wherein the recipient-side radio unit or the other recipient-side device is configured to receive the output test signal.

14. A system comprising:

a transmission arrangement according to claim 12; and a sender-side personal protective equipment, wherein the sender-side voice input unit, the sender-side radio unit, and the signal processing unit are components of the sender-side personal protective equipment, and wherein the sender-side personal protective equipment is configured to be worn by a human being on his or her body.

15. The system according to claim 14, wherein the system further comprises recipient-side personal protective equipment, wherein the recipient-side voice output unit and the recipient-side radio unit are components of the recipient-side personal protective equipment, and wherein the recipient-side personal protective equipment is configured to be worn by a human being on his or her body.

* * * * *